(12) United States Patent
Okawara

(10) Patent No.: US 7,834,929 B2
(45) Date of Patent: Nov. 16, 2010

(54) IMAGING APPARATUS

(75) Inventor: Hiroto Okawara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 326 days.

(21) Appl. No.: 11/777,862

(22) Filed: Jul. 13, 2007

(65) Prior Publication Data

US 2008/0024649 A1     Jan. 31, 2008

(30) Foreign Application Priority Data

Jul. 25, 2006  (JP)  ............................. 2006-202132

(51) Int. Cl.
  *H04N 5/232* (2006.01)
  *G03B 3/10* (2006.01)
  *G03B 13/20* (2006.01)

(52) U.S. Cl. ................. 348/347; 348/345; 348/348; 348/349; 348/353; 348/354; 396/121; 396/139; 396/140

(58) Field of Classification Search ........... 348/347, 348/345, 353, 348; 396/121, 139, 140
See application file for complete search history.

(56) References Cited

U.S. PATENT DOCUMENTS 5,848,301 A * 12/1998 Nonaka ................. 396/56
5,974,272 A * 10/1999 Kiesow et al. .......... 396/140
6,222,996 B1 * 4/2001 Nonaka ................. 396/104
6,522,393 B2 * 2/2003 Higashino .............. 356/3.03

FOREIGN PATENT DOCUMENTS

| JP | 2001-290072 A | 10/2001 |
| JP | 2002-258147 A | 9/2002 |
| JP | 2005-189533 A | 7/2005 |
| JP | 2005-308770 A | 11/2005 |
| JP | 2006-072384 A | 3/2006 |
| JP | 2006-119222 A | 5/2006 |

* cited by examiner

*Primary Examiner*—David L Ometz
*Assistant Examiner*—Quang V Le
(74) *Attorney, Agent, or Firm*—Canon U.S.A., Inc. I.P. Division

(57) ABSTRACT

An imaging apparatus includes an imaging unit configured to photoelectrically convert light of an object image formed by an imaging optical system to generate a signal, a first detection unit configured to detect a focusing state of the imaging optical system based on the signal generated by the imaging unit, a sensor configured to generate a signal different from the signal generated by the imaging unit without using the imaging optical system, and a second detection unit configured to detect an in-focus position of the imaging optical system based on the signal generated by the sensor. The sensor is located such that an amount of overlap between a detection range of the first detection unit and a detection range of the second detection unit at a first object distance is equal to an amount of overlap between those at a second object distance that is close to an infinite distance side compared to the first object distance.

7 Claims, 8 Drawing Sheets

FIG.8

TABLE 801
UNITS: mm (EXCEPT MAGNIFICATION)

| COLUMN 802 | COLUMN 803 | COLUMN 804 | COLUMN 805 | COLUMN 806 | COLUMN 807 | COLUMN 808 | COLUMN 809 | COLUMN 810 | COLUMN 811 | COLUMN 812 | COLUMN 813 | COLUMN 814 | COLUMN 815 |
|---|---|---|---|---|---|---|---|---|---|---|---|---|---|
| OBJECT DISTANCE | $\beta$ | IMAGE SENSOR HORIZONTAL SIZE | IMAGE SENSOR VERTICAL SIZE | Wx' | Wy' | Wx | Wy | $\beta s$ | Sx' | Sy' | k | rx | ry |
| 1000 | -0.04984 | 5.28 | 2.97 | 1.32 | 0.9801 | 26.484751 | 19.664928 | -0.006 | 1.14 | 0.135 | 0.6 | 275.345 | 27.648 |
| 1100 | -0.04591 | 5.28 | 2.97 | 1.32 | 0.9801 | 28.751906 | 21.34829 | -0.0055 | 1.14 | 0.135 | 0.6 | 319.12 | 32.1242 |
| 1200 | -0.04258 | 5.28 | 2.97 | 1.32 | 0.9801 | 31.00047 | 23.017849 | -0.005 | 1.14 | 0.135 | 0.6 | 367.767 | 37.1024 |
| 1300 | -0.03971 | 5.28 | 2.97 | 1.32 | 0.9801 | 33.240997 | 24.68144 | -0.0046 | 1.14 | 0.135 | 0.6 | 422.138 | 42.6683 |
| 1400 | -0.03721 | 5.28 | 2.97 | 1.32 | 0.9801 | 35.474336 | 26.339694 | -0.0043 | 1.14 | 0.135 | 0.6 | 483.31 | 48.932 |
| 1500 | -0.03501 | 5.28 | 2.97 | 1.32 | 0.9801 | 37.703513 | 27.994859 | -0.004 | 1.14 | 0.135 | 0.6 | 552.639 | 56.0321 |
| 1600 | -0.03307 | 5.28 | 2.97 | 1.32 | 0.9801 | 39.915331 | 29.637133 | -0.0038 | 1.14 | 0.135 | 0.6 | 631.879 | 64.1519 |
| 1700 | -0.03133 | 5.28 | 2.97 | 1.32 | 0.9801 | 42.132142 | 31.283115 | -0.0035 | 1.14 | 0.135 | 0.6 | 723.308 | 73.5193 |
| 1800 | -0.02977 | 5.28 | 2.97 | 1.32 | 0.9801 | 44.33994 | 32.922405 | -0.0033 | 1.14 | 0.135 | 0.6 | 829.98 | 84.4513 |
| 1900 | -0.02836 | 5.28 | 2.97 | 1.32 | 0.9801 | 46.544429 | 34.559238 | -0.0032 | 1.14 | 0.135 | 0.6 | 956.048 | 97.3722 |
| 2000 | -0.02708 | 5.28 | 2.97 | 1.32 | 0.9801 | 48.744461 | 36.192762 | -0.003 | 1.14 | 0.135 | 0.6 | 1107.33 | 112.879 |
| 3000 | -0.0187 | 5.28 | 2.97 | 1.32 | 0.9801 | 70.588235 | 52.411765 | -0.002 | 1.14 | 0.135 | 0.6 | – | – |
| 5000 | -0.01158 | 5.28 | 2.97 | 1.32 | 0.9801 | 113.98964 | 84.637306 | -0.0012 | 1.14 | 0.135 | 0.6 | -1389.1 | -143.16 |
| 10000 | -0.00595 | 5.28 | 2.97 | 1.32 | 0.9801 | 221.84874 | 164.72269 | -0.0006 | 1.14 | 0.135 | 0.6 | -794.78 | -82.252 |
| 20000 | -0.00302 | 5.28 | 2.97 | 1.32 | 0.9801 | 437.08609 | 324.53642 | -0.0003 | 1.14 | 0.135 | 0.6 | -654.96 | -67.934 |
| 50000 | -0.00122 | 5.28 | 2.97 | 1.32 | 0.9801 | 1081.9672 | 803.36066 | -0.0001 | 1.14 | 0.135 | 0.6 | -592.5 | -61.544 |
| 100000 | -0.00061 | 5.28 | 2.97 | 1.32 | 0.9801 | 2163.9344 | 1606.7213 | -6E-05 | 1.14 | 0.135 | 0.6 | -574.21 | -59.645 |

IMAGING APPARATUS

BACKGROUND OF THE INVENTION

1. Field of the Invention

The present invention relates to an imaging apparatus that can perform an automatic focusing (AF) control.

2. Description of the Related Art

The TV-AF system, known as a conventional AF control system applied to a video camera or other imaging apparatus, is configured to extract a predetermined high-frequency component (contrast component) as an AF signal from a video signal and to control a focusing lens to maximize the AF signal. As another type, there is an AF control system configured to perform a focusing control based on a signal from a distance sensor that can measure the distance to an object or a focal deviation.

As discussed in Japanese Patent Application Laid-Open No. 2002-258147, the above-described TV-AF system and the AF control system using a distance sensor can be combined to realize a hybrid AF control. In general, the TV-AF system can perform a precise focusing control. However, the TV-AF system requires a long focusing time to detect a lens position where the AF signal can be maximized. On the other hand, the AF control system using a distance sensor can reduce the focusing time.

As discussed in Japanese Patent Application Laid-Open No. 2002-258147, an internal measuring system is usable for the AF control performed based on a separately provided distance sensor. According to the internal measuring system, light having entered an imaging optical system is split by a beam splitting mechanism and the split beam is input into the distance sensor to measure the deviation of a focus.

Furthermore, as discussed in Japanese Patent Application Laid-Open No. 2002-258147, an external measuring system is employable for the AF control system that includes an imaging optical system and a distance sensor which are separately provided.

According to the above-described internal measuring system, the distance sensor can directly receive an object image captured by the imaging optical system. Thus, the distance sensor does not fail to capture an object. However, the body size of a lens barrel (or the imaging apparatus) tends to become large because the beam splitting mechanism and the distance sensor are installed in the lens barrel.

On the other hand, the external measuring system can provide a higher degree of freedom in the layout because the imaging optical system and the distance sensor are independently disposed. As a result, the external measuring system can realize a compact apparatus.

As described above, if a focusing control based on a distance sensor is combined with a focusing control based on the TV-AF system, an in-focus position of the focusing lens can be speedily detected and the entire focusing time can be reduced.

However, the above-described external measuring system has a problem arising from parallax between an optical axis of the imaging optical system and a measuring axis of the distance sensor, because the distance sensor and the imaging optical system are located independent from each other. In particular, when a zoom position is set to a telephoto side, the angle of view becomes so narrower that the distance sensor may capture an object different from a principal object captured by the imaging optical system.

Furthermore, if the zoom position is set to a telephoto side, the TV-AF system extracts an AF signal (high-frequency component) in a narrow range. Thus, the range for extracting an AF signal may deviate from the measuring axis of the distance sensor. The focus control may not be performed accurately.

SUMMARY OF THE INVENTION

Exemplary embodiments of the present invention are directed to an imaging apparatus capable of reducing erroneous operations originated from parallax in the focus control.

According to an aspect of the present invention, an imaging apparatus includes an imaging unit configured to photoelectrically convert light of an object image formed by an imaging optical system to generate a signal; a first detection unit configured to detect a focusing state of the imaging optical system based on the signal generated by the imaging unit; a sensor configured to generate a signal different from the signal generated by the imaging unit without using the imaging optical system; and a second detection unit configured to detect an in-focus position of the imaging optical system based on the signal generated by the sensor, wherein the sensor is located such that an amount of overlap between a detection range of the first detection unit and a detection range of the second detection unit at a first object distance is equal to an amount of overlap between those at a second object distance that is close to an infinite distance side compared to the first object distance.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, and features of the invention and, together with the description, serve to explain at least some of the principles of the invention.

FIG. 8 illustrates numerical data calculated based on the relationships illustrated in FIGS. 5A, 5B, and 6.

DETAILED DESCRIPTION OF THE EMBODIMENTS

Figure 1:
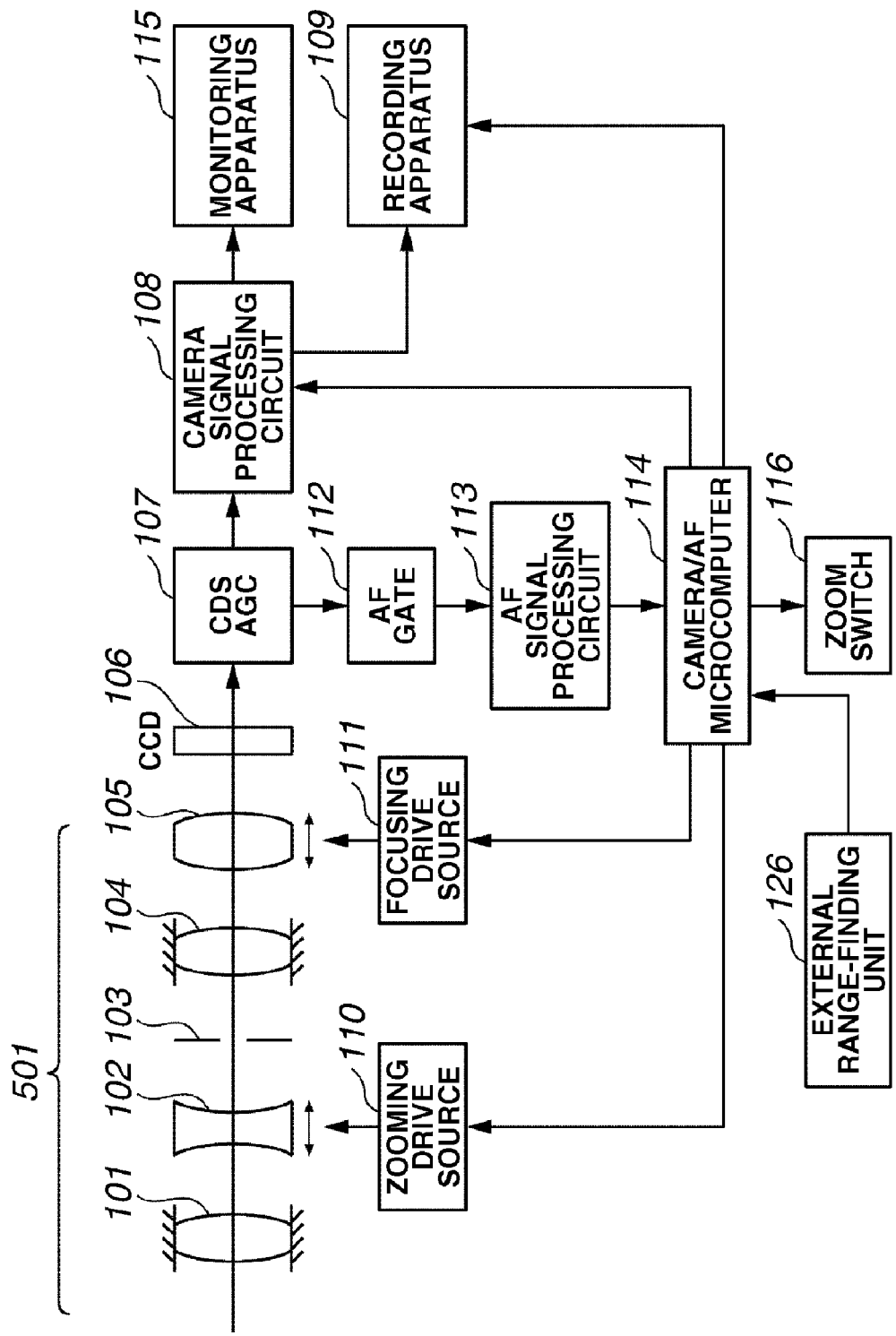
FIG. 1 illustrates an example imaging apparatus according to an exemplary embodiment according to the present invention.

The following description of exemplary embodiments is merely illustrative in nature and is in no way intended to limit the invention, its application, or uses.

It is noted that throughout the specification, similar reference numerals and letters refer to similar items in the following figures, and thus once an item is described in one figure, it may not be discussed for following figures.

Exemplary embodiments will now herein be described in detail below with reference to the drawings.

First Exemplary Embodiment

FIG. 1 illustrates an imaging apparatus according to an exemplary embodiment of the present invention. The imaging apparatus includes a first stationary lens unit 101, a zooming lens 102, an iris 103, a second stationary lens unit 104, a focusing lens 105, an image sensor 106, a correlated double sampling/auto gain control (CDS/AGC) circuit 107, a camera signal processing circuit 108, a recording apparatus 109, a zooming drive source 110, a focusing drive source 111, an AF gate 112, an AF signal processing circuit 113, a camera/AF microcomputer 114, a monitoring apparatus 115, a zoom switch 116, and an external range-finding unit 126.

The zooming lens 102 is a variator lens unit that can perform a variable power control. The focusing lens 105 is a lens unit capable of performing a focus control and compensating for the movement of a focal plane caused by the variable power. The zooming drive source 110 can move the zooming lens 102 in a direction parallel to the optical axis (i.e., right and left direction in FIG. 1). Similarly, the focusing drive source 111 can move the focusing lens 105 in the direction parallel to the optical axis.

Incident light from an object (i.e., object light) passes through an imaging optical system (image pickup lens 501), which includes the lens units 101 through 105 and the iris 103, and forms an image on the image sensor 106. The image sensor 106 is a photoelectric conversion element, such as a charge-coupled device (CCD) or a complementary metal-oxide semiconductor sensor (CMOS), which can convert an object image into an electric signal. The electric signal from the image sensor 106 is read and amplified by the CDS/AGC circuit 107 and is then input to the camera signal processing circuit 108.

The camera signal processing circuit 108 performs predetermined video signal processing to convert the input signal into a signal processible in the recording apparatus 109 and the monitoring apparatus 115. The recording apparatus 109 can record an object image on a recording medium (e.g., a magnetic tape, an optical disk, or a semiconductor memory). The monitoring apparatus 115 displays an object image on an electronic viewfinder or on a liquid crystal panel.

The AF gate 112 receives an output (i.e., a full-screen video signal) from the CDS/AGC circuit 107 and selects a signal of a predetermined screen area used for a focusing control. The AF signal processing circuit 113 receives an output from the AF gate 112 and extracts an AF signal (i.e., a signal representing a focusing state), such as a high-frequency component used for focusing detection or a luminance difference component (i.e., a difference between a maximum luminance level and a minimum luminance level in the video signal).

The camera/AF microcomputer 114 is a microcomputer which controls the operation of the imaging apparatus. The camera/AF microcomputer 114 performs calculations for a hybrid AF control based on an output from the AF signal processing circuit 113 and an output from the external range-finding unit 126. The camera/AF microcomputer 114 controls the focusing drive source 111 and performs a focusing control based on the calculation result.

Figure 7:
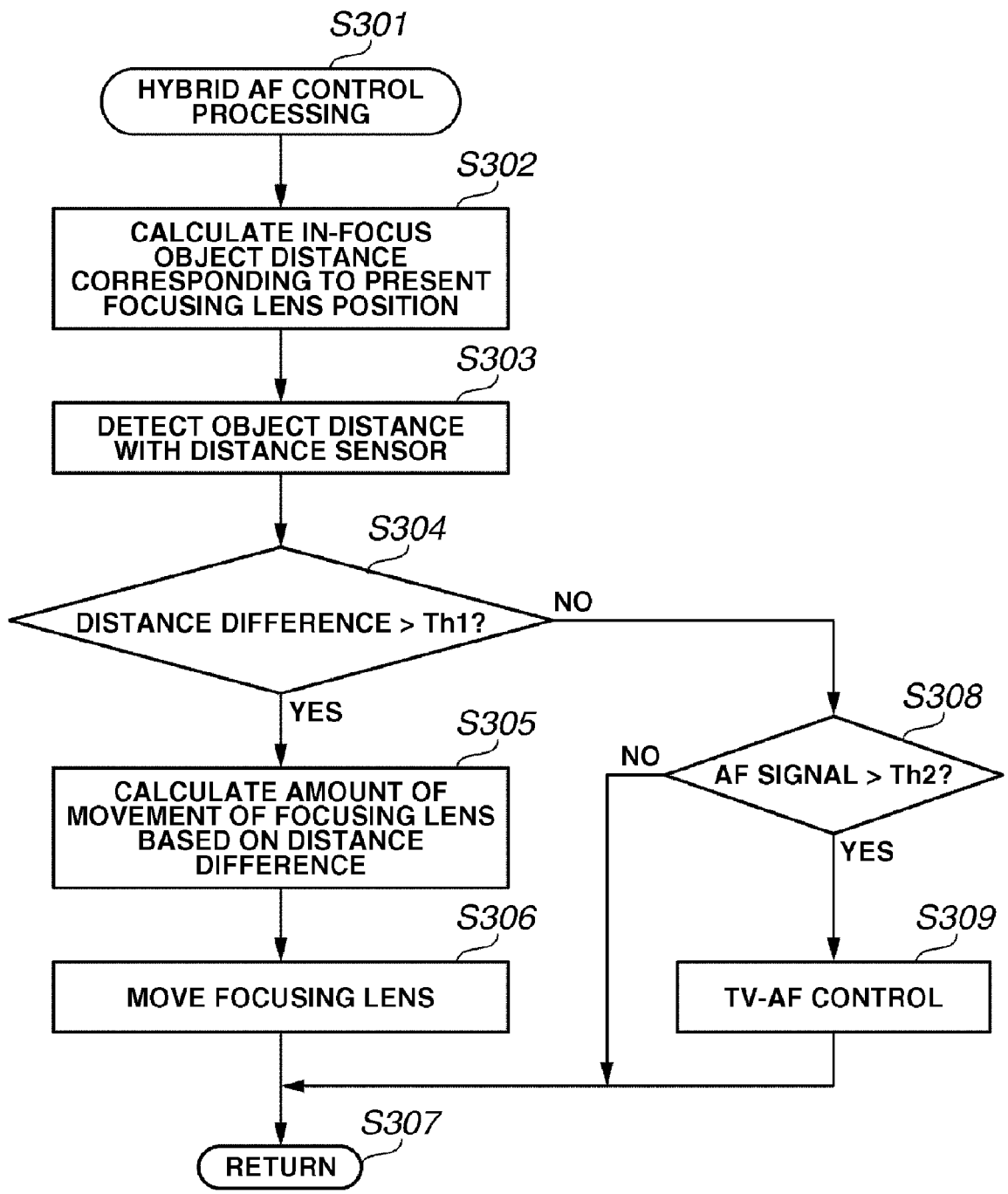
FIG. 7 is a flowchart illustrating exemplary hybrid AF control processing.

An exemplary hybrid AF control operation S301 based on an external measuring system is described below with reference to the flowchart of FIG. 7.

First, in step S302, the camera/AF microcomputer 114 calculates an in-focus object distance corresponding to the present position of the focusing lens 105. In step S303, the camera/AF microcomputer 114 detects an actual object distance based on the information obtained from a distance sensor (external range-finding unit 126). In step S304, the camera/AF microcomputer 114 determines whether a difference between two object distances obtained in steps S302 and S303 is greater than a predetermined threshold Th1.

If the difference between two object distances is greater than the threshold Th1 (YES in step S304), the camera/AF microcomputer 114 determines that the focusing lens 105 is in a large defocused state. The processing flow proceeds to step S305. In step S305, the camera/AF microcomputer 114 calculates the amount of movement of the focusing lens 105 corresponding to the difference between two object distances.

In step S306, the camera/AF microcomputer 114 moves the focusing lens 105 to adjust the focus of the focusing lens 105 to the object distance obtained by the distance sensor. In step S307, the camera/AF microcomputer 114 terminates this routine to execute predetermined camera control processing other than the AF control.

On the other hand, if the difference between two object distances is not greater than the threshold Th1 (NO in step S304), the camera/AF microcomputer 114 determines that the focusing lens 105 is almost in an in-focus state. Thus, the camera/AF microcomputer 114 starts a fine adjustment control based on the TV-AF system, which can precisely perform focusing processing.

To this end, in step S308, the camera/AF microcomputer 114 determines whether the above-described AF signal is greater than a predetermined threshold Th2. If the camera/AF microcomputer 114 determines that the AF signal is greater than the threshold Th2 (YES in step S308), the processing flow proceeds to step S309. In step S309, the camera/AF microcomputer 114 performs an AF control based on the TV-AF system to determine the in-focus position of the focusing lens 105 (i.e., a final in-focus position). Then in step S307, the camera/AF microcomputer 114 terminates the AF control and returns to other camera control processing.

On the other hand, if the AF signal is not greater than the threshold Th2 (NO in step S308), the camera/AF microcomputer 114 determines that the focusing operation cannot be accurately performed due to noise components involved in the AF signal. Thus, the processing flow proceeds to step S307 to execute the camera control processing other than the AF control, without performing the AF control.

As described above, when the rough focusing operation using information from the distance sensor is combined with the precise focusing operation based on the TV-AF system, the focusing time (i.e., the time required for obtaining an in-focus position of the focusing lens 105) can be reduced.

Figure 3:
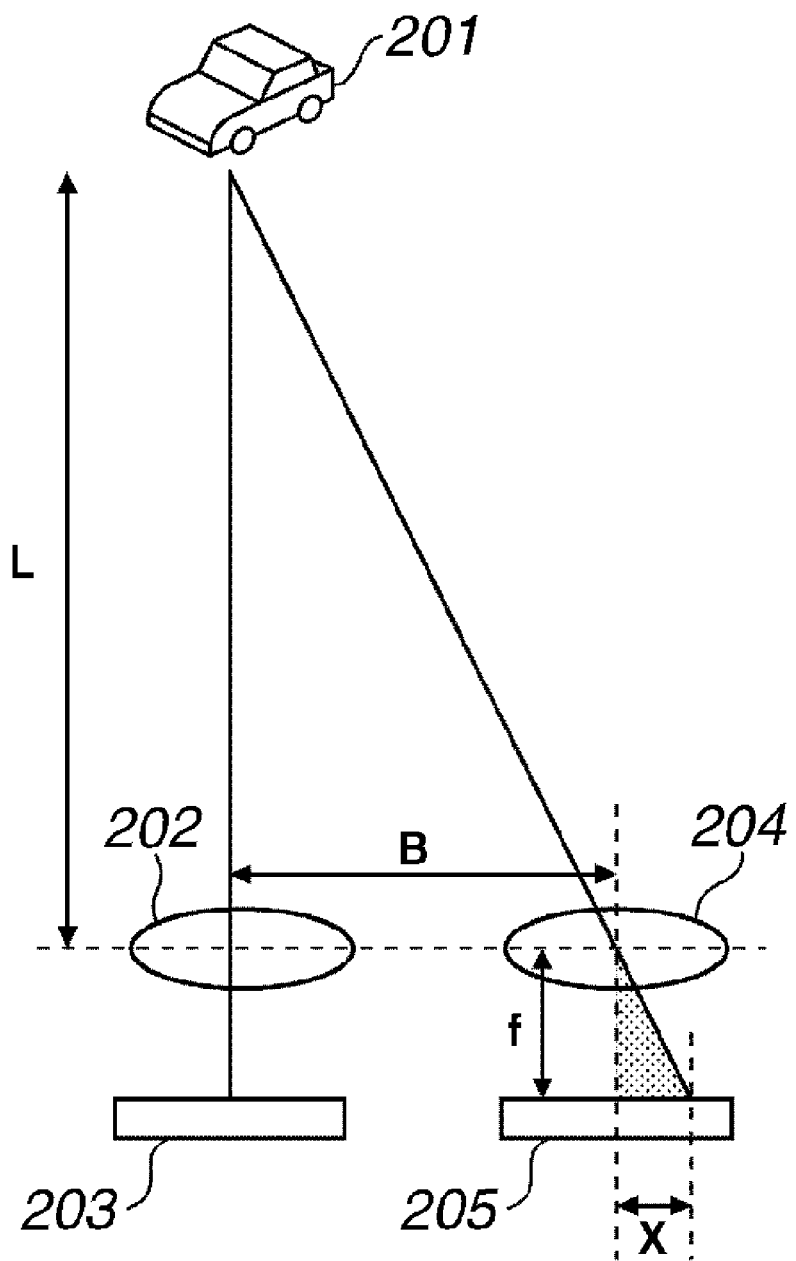
FIG. 3 illustrates the configuration of a phase-difference passive distance sensor.
Figure 4:
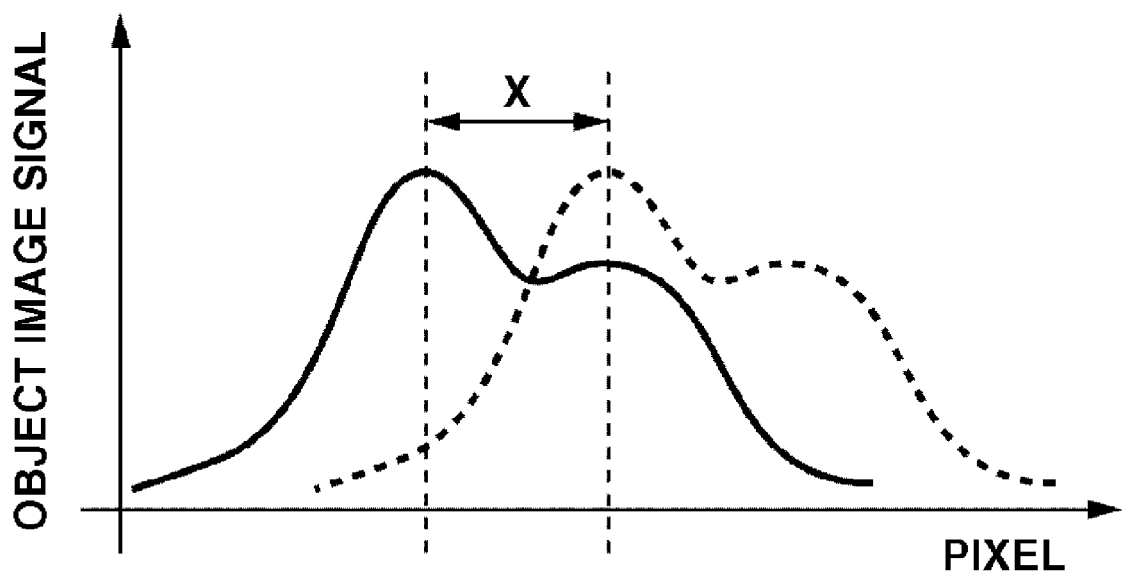
FIG. 4 illustrates exemplary object image signals obtained by the distance sensor illustrated in FIG. 3.

The external range-finding unit 126 is a sensor configured to measure an object distance based on an external measuring system and to output the measured result. FIGS. 3 and 4 illustrate a range-finding principle according to a phase-difference passive system, which is one of conventional range-finding systems.

The example illustrated in FIG. 3 includes an object 201, an image-forming lens 202 disposed on a first optical path, a light-receiving element array 203 disposed on the first optical path, an image-forming lens 204 disposed on a second optical path, and a light-receiving element array 205 disposed on the second optical path.

The center of the light-receiving element array 203 and the center of the light-receiving element array 205 are mutually spaced by the distance equal to a base length B. The object light (i.e., light from the object 201) travels along the first optical path and, after having passed through the first image-forming lens 202, forms an object image on the light-receiving element array 203. The object light also travels along the second optical path and, after having passed through the second image-forming lens 204, forms an object image on the light-receiving element array 205.

FIG. 4 illustrates object image signals read by the light-receiving element arrays 203 and 205. When the two light-receiving element arrays 203 and 205 are spaced by the distance equal to the base length B, the object image signals deviate from each other by the number of pixels X as illustrated in FIG. 3.

The number of pixels X can be calculated by calculating the correlation between two object image signals while shifting pixels and obtaining an amount of pixel shifting that maximizes the correlation. The following formula (1) represents an object distance L which can be calculated based on the principle of triangulation using the number of pixels X, the base length B, and a focal length "f" of the image-forming lenses 202 and 204.

$$L=(B \cdot f)/X \qquad (1)$$

According to the above-described method, the focusing lens 105 can be positioned at an in-focus position (i.e., a position where the focusing lens 105 is in an in-focus state). Although the above-described embodiment is described based on a passive range-finding system, the present invention can be applied to other systems, such as an ultrasonic sensor (i.e., an active system) that can measure a propagation speed or a triangulation system using an infrared projection which can be used in a compact camera.

In the present exemplary embodiment, the installation position of the external range-finding unit 126 is determined in the following manner. In the following description, the external range-finding unit 126 is a distance sensor that performs a phase-difference detection based on the passive system illustrated in FIGS. 3 and 4.

Figure 2:
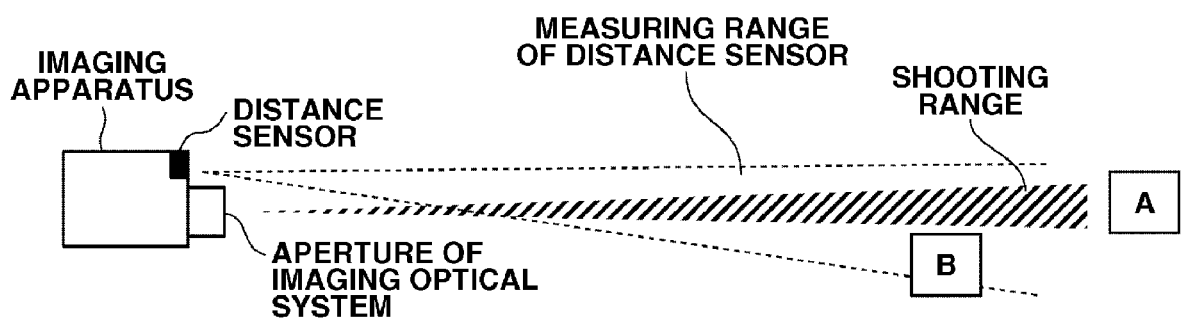
FIG. 2 illustrates exemplary parallax in a condition where an angle of view of an imaging optical system is set to a telephoto side.

FIG. 2 illustrates a shooting range (a measurement range or a detection range in the TV-AF system) of the imaging apparatus and a measurement range (detection range) of the distance sensor (external range-finding unit 126) when a zoom position of the imaging apparatus is set to a telephoto side.

The angle of view becomes narrow when the zoom position is set to the telephoto side. As illustrated in FIG. 2, the distance sensor may capture an object B different from a principal object A actually captured by the imaging apparatus. The imaging apparatus may not be able to complete a focusing operation or take a long time to complete the focusing operation. As a result, the focus control operation may be failed.

In view of the foregoing problem, the present exemplary embodiment determines the installation position of the external range-finding unit 126 in the following manner.

Figure 5A:
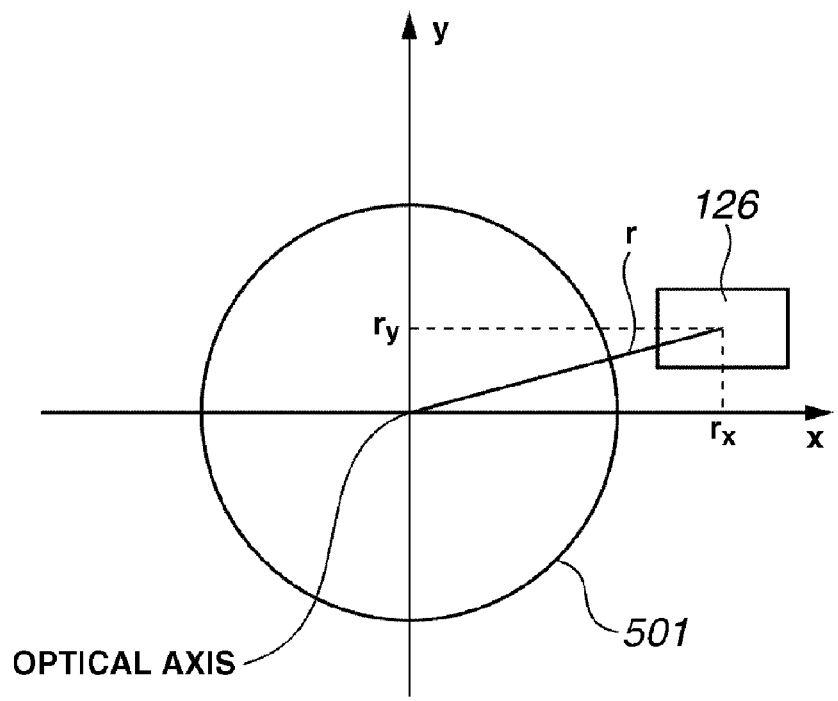
FIGS. 5A and 5B illustrate a relationship between an image pickup lens and an imaging optical system of an external range-finding unit.

As illustrated in FIG. 5A, the installation position of the external range-finding unit 126 can be expressed using a distance "r" between the optical axis of the image pickup lens 501 (i.e., the center of the angle of view set by the imaging optical system) and the center of the external range-finding unit 126.

In FIG. 5A, x and y coordinate axes extend in horizontal and vertical directions from the optical axis of the image pickup lens 501, respectively. The horizontal and vertical components of the distance "r" can be expressed by $r_x$ and $r_y$, respectively.

Figure 5B:
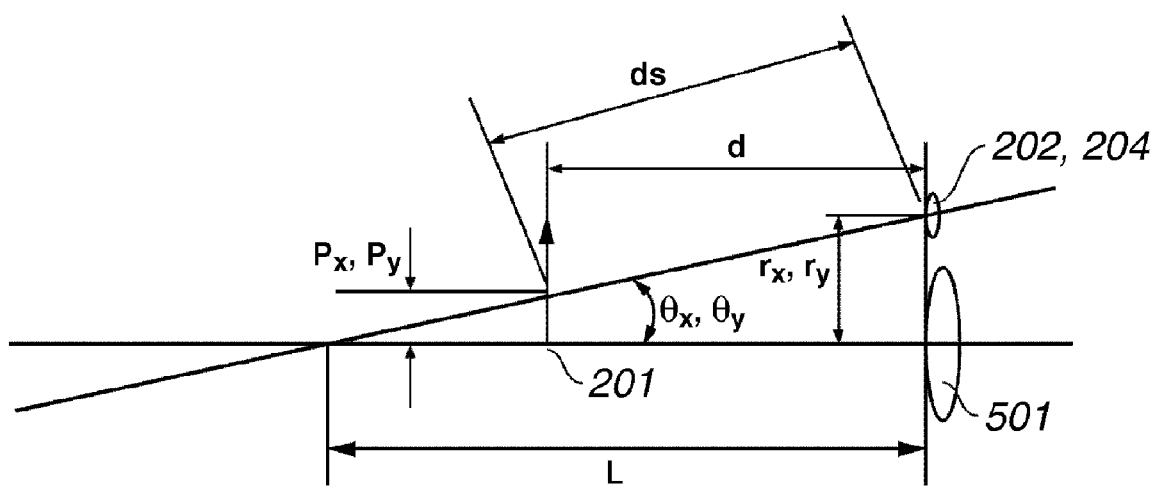

FIG. 5B is an illustration of the imaging optical system as viewed along a line perpendicular to the drawing surface of FIG. 5A.

In FIG. 5B, "ds" represents a distance between the image-forming lens 202 (204) of the external range-finding unit 126 and the object 201, and "d" represents a distance between the image pickup lens 501 and the object 201, while Px and Py represent parallax components caused in this condition.

L represents a reference distance where the parallax between the image pickup lens 501 and the image-forming lens 202 (204) becomes zero. The angular components θx and θy represent an angle between the optical axis of the image pickup lens 501 and the optical axis of the external range-finding unit 126 (i.e., image-forming lens 202 or 204).

The parallax components Px and Py can be expressed by the following formula (2) based on a relationship "tan θx =rx/L=Px/(L−d)" established as illustrated in FIG. 5B.

$$Px=(L-d)*r_x/L$$

$$Py=(L-d)*r_y/L \qquad (2)$$

Figure 6:
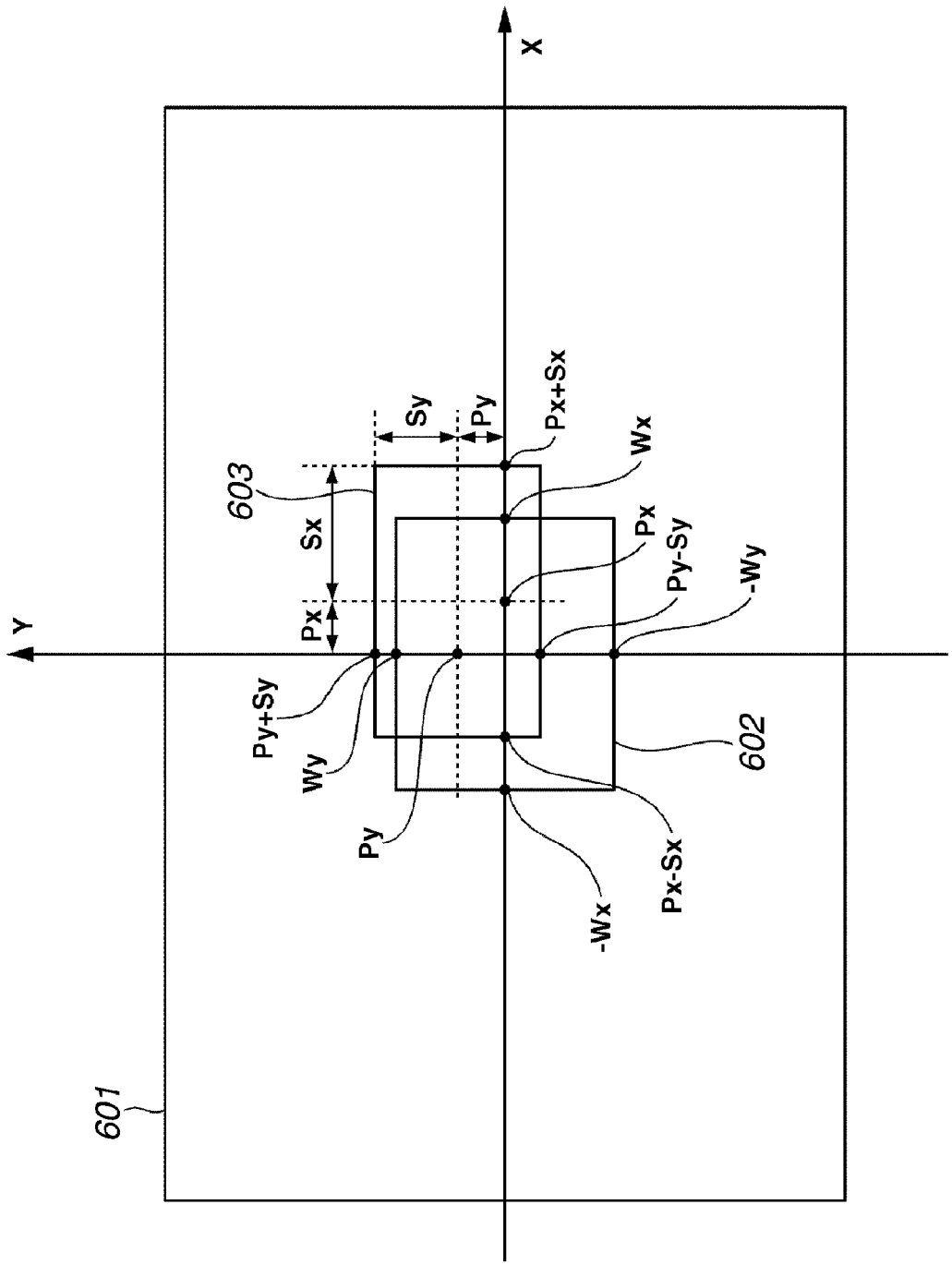
FIG. 6 illustrates a relationship between an imaging area in an AF frame and a range-finding area of an external range-finding unit.

FIG. 6 illustrates a real object image screen formed on the image sensor 106. In FIG. 6, an object image area (i.e., an angle of view) 601 corresponds to a full-size screen that can be captured by the image sensor 106. A real object image area (i.e., the measurement range according to the TV-AF system) 602 corresponds to the area of the AF frame where an AF signal is extracted for a focus control based on the TV-AF system.

In FIG. 6, coordinate axes X and Y extend in horizontal and vertical directions, respectively, from an origin which is set on the center of the object image area 602 of the AF frame. An area 603 illustrated in FIG. 6 indicates a range-finding area (i.e., a measurement range of the distance sensor) which can be viewed on an imaging screen through the external range-finding unit 126.

The example illustrated in FIG. 6 represents a real image of an object captured when the zoom position of the image pickup lens 501 is set to the most telephoto end. The parallax components Px and Py can represent a deviation of the center of the area 603 relative to the center of the area 602.

In the present exemplary embodiment, the object image area 602 in the TV-AF frame has horizontal and vertical widths Wx and Wy, respectively, representing the image size defined as a distance from the center. Although not illustrated in FIG. 6, Wx' and Wy' represent the widths of the AF frame on a virtual image sensor.

Similarly, Sx' and Sy' (not illustrated) represent virtual widths of the range-finding area of the external range-finding unit 126 corresponding to the imaging screen. Sx and Sy represent widths of the range-finding area corresponding to the size of a real image.

The image-forming lens 201 (202) of the external range-finding unit 126 is a single convex lens. Therefore, when "f" represents a focal length of the image-forming lens 202 (204), a magnification rate βs (i.e., the ratio of the virtual object image size Sx', Sy' to the actual object image size Sx, Sy on the image-forming plane) can be expressed by the following formula (3).

$$\beta s=Sx'/Sx=Sy'/Sy=(1/-ds)*(f*(-ds))/(f+(-ds)) \qquad (3)$$

wherein, the sign becomes positive at the image-forming side of the convex lens and negative at the object side.

In the present exemplary embodiment, the range-finding area 603 illustrated in FIG. 6 is a range obtained when the zoom position of the image pickup lens 501 is set to the most telephoto end.

For example, if the image pickup lens 501 is a 10× optical zoom lens, the parallax components Px and Py and the object image components Sx and Sy of the range-finding area are reduced to 1/10 at the widest angle end (1× optical zoom), compared to those of the range-finding area 603 illustrated in FIG. 6. In other words, the range-finding area 603 is completely involved in the object image area 602 of the TV-AF frame and positioned close to the center of the object image area 602 of the TV-AF frame.

Namely, the view point of the external range-finding unit 126 overlaps almost the center of the view point of the image pickup lens 501. Thus, both the external range-finding unit 126 and the image pickup lens 501 can obtain focusing information of the same object. As the zoom position is set at a telephoto side, the parallax size becomes large and the problem described in the related art may arise.

In the present exemplary embodiment, the external range-finding unit 126 is located in such a way that the view point of the external range-finding unit 126 can overlap an object in the TV-AF frame at least in a predetermined amount of overlap. In other words, the present exemplary embodiment determines the installation position of the external range-finding unit 126 in such a way that a rough focusing operation and a precise focusing operation can be performed at the same object distance according to the hybrid AF control described in the flowchart of FIG. 7.

Thus, even if the image pickup lens 501 has a high magnification, an object that is detected by the distance sensor and an object on which focusing is performed with the TV-AF system can be the same.

The present exemplary embodiment determines a required amount of overlap based on the illustrations of FIGS. 5A, 5B, and 6, and, as a result, determines the installation position ($r_x$, $r_y$) of the external range-finding unit 126 in the following manner.

It is now assumed that the deviation between two objects on which focusing is performed with the TV-AF system and the external measuring system can be neglected if the object image area 602 in the AF frame overlaps the range-finding area 603 of the external range-finding unit 126 at least at an overlap coefficient "k" with reference to FIG. 6.

The following formula (4) can be obtained.

$$Wx-(Px-Sx) \geq k*2Wx$$
$$Wy-(Py-Sy) \geq k*2Wy \quad (4)$$

The following formula (5) is derived when Px, Py, Sx, and Sy of the formulas (2) and (3) are input to the above-described formula (4).

$$r_x \leq (L/L-d)(Wx(1-2k)+(-ds)*Sx'*(f;+(-ds))/(f*(-ds)))$$
$$r_y \leq (L/L-d)(Wy(1-2k)+(-ds)*Sy'*(f;+(-ds))/(f*(-ds))) \quad (5)$$

Accordingly, it is useful to install the external range-finding unit 126 at a position within a distance range satisfying values $r_x$ and $r_y$ defined in the formula (5) from the optical axis illustrated in FIG. 5A.

Namely, the amount of overlap between a detection range of the TV-AF system and a detection range of the distance sensor at a given object distance becomes equal to the amount of overlap between those at another object distance which is close to the infinite distance side compared to the given object distance. In other words, the amount of overlap is maximized at a predetermined object distance. Then, the amount of overlap decreases when the object distance increases or decreases from the predetermined object distance. Thus, the present exemplary embodiment enables the external measuring system to focus on a principal object on which focusing is performed with the TV-AF system. Therefore, the present exemplary embodiment can reduce any erroneous operation originated from the parallax even when the hybrid AF control illustrated in FIG. 7 is performed.

When exemplary values are input to the formula (5), the horizontal and vertical widths Wx and Wy of a real image of a captured object can be obtained from the magnification rate P defined by the image pickup lens 501 and the size of the AF frame relative to the image sensor 106.

In the present exemplary embodiment, the image pickup lens 501 is a rear focus type lens. The magnification rate β can be determined based on the focal length and the object distance, which are variable as design factors.

FIG. 8 is a table 801 of numerical data calculated based on the relationships illustrated in FIGS. 5A, 5B, and 6. In FIG. 8, column 802 indicates the distance to an object. Column 803 indicates the magnification rate β at the most telephoto end (optical characteristics at the imaging side), which varies with the object distance. Column 804 indicates a horizontal size of the image sensor 108. Column 805 indicates a vertical size of the image sensor 108. Column 806 indicates a horizontal size of an AF frame projected on a plane of the image sensor 108. Column 807 indicates a vertical size of the projected AF frame.

In the example illustrated in FIG. 8, the AF frame is equivalent to 1/4 of the full-size screen in the horizontal direction and 1/3 in the vertical direction. The real image size of an object just fitting to the AF frame is determined based on the relationship β=Wx'/Wx=Wy'/Wy. Column 808 indicates the horizontal real image size Wx, and column 809 indicates the vertical real image size Wy.

In the example illustrated in FIG. 8, the parallax becomes zero when the distance L is equal to 3 m for the actual object distance "d" indicated in column 802.

The focal length "f" of the image-forming lens 202 (204) of the external range-finding unit 126 (i.e., optical characteristics of the external range-finding unit 126) is a design value. The actual distance "ds" from the image-forming lens 202 (204) to the object is substantially equal to the distance "d" when the parallax angle is small.

Column 810 indicates the magnification rate βs of the image-forming lens 202 (204) calculated based on the formula (3). Columns 811 and 812 indicate Sx' and Sy' determined from the size of the light-receiving element array 203 (205) of the external range-finding unit 126, which are design values dependent on a unit to be used.

Column 813 represents the overlap coefficient "k" which can be determined when the above-described numerical conditions are input to the formula (5). The deviation ($r_x$, $r_y$) from the optical axis can be determined based on the overlap coefficient "k."

In the present exemplary embodiment, the overlap coefficient "k" is set to 0.6 so that an overlap area of the AF frame and the range-finding area becomes equal to 60% or more. Columns 814 and 815 indicate maximum values of the deviation components $r_x$ and $r_y$.

When the object distance is in a range from 1 m (closest distance side) to 100 m (infinite distance side), it is useful that the external measuring range-finding unit 126 has a vertical deviation of 2.8 cm or less from the optical axis and a horizontal deviation of 27.5 cm or less from the optical axis, as understood from the numerical data illustrated in FIG. 8.

As described above, the present exemplary embodiment can appropriately determine the installation position of the external range-finding unit 126 so as to reduce erroneous operations in the AF control originated from the parallax. Furthermore, the present exemplary embodiment enables the imaging apparatus to precisely focus on an object within the imaging angle of view.

In the above-described exemplary embodiment, the size of the AF frame 602 is equivalent to ¼ of the imaging angle of view 601 in the horizontal direction and ⅓ in the vertical direction. However, the present exemplary embodiment is applicable even in a case where the center of the AF frame 602 deviates from the center of the imaging angle of view 601.

For example, if a main target is positioned at a lower side of the imaging angle of view 601, the AF frame 602 is extended toward the lower side of the screen (for example, by an amount of 10%). Accordingly, the optical axis of the image pickup lens 501 deviates from the center of the AF frame 602. Even in such a case, the present exemplary embodiment is useful because the installation position of the external range-finding unit 126 is determined to maintain at least a predetermined overlap rate (i.e., 60% according to the above-described embodiment).

Other Exemplary Embodiments

Software program code for realizing the flowcharts of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable in a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses supplying program code to a computer with a storage (or recording) medium storing the program code. In this case, the type of program can be any one of object code, interpreter program, and OS script data. A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses World Wide Web (WWW) servers that allow numerous users to download the program files so that the functions or processes of the present invention can be realized on their computers.

Enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Moreover, an operating system (OS) or other application software running on the computer can execute part or all of the actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-202132 filed Jul. 25, 2006, which is hereby incorporated by reference herein in its entirety.

What is claimed is:

1. An imaging apparatus comprising:
   an imaging unit configured to photo-electrically convert light of an object image formed by an imaging optical system to generate an image signal;
   a first detection unit configured to detect an in-focus state of the imaging optical system based on a high-frequency component of the image signal generated by the imaging unit;
   a sensor configured to generate a signal different from the image signal generated by the imaging unit without using the imaging optical system; and
   a second detection unit configured to detect an in-focus position of the imaging optical system based on the signal generated by the sensor,
   wherein the sensor is located such that an amount of overlap between a detection range of the first detection unit and a detection range of the second detection unit at a first object distance is equal to an amount of overlap between those at a second object distance that is close to an infinite distance side compared to the first object distance is more than a predetermined amount of overlap between wide-angle of view and telephoto at a predetermined object distance.

2. The imaging apparatus according to claim 1, wherein the first detection unit is configured to detect the in-focus state of the imaging optical system based on a signal generated by the imaging unit in a detection range having a center deviating from a center of an imaging angle of view.

3. The imaging apparatus according to claim 1, wherein the amount of overlap is determined based on an optical characteristic and size of the imaging unit and an optical characteristic and size of the sensor.

4. The imaging apparatus according to claim 3, wherein the optical characteristic of the imaging unit includes a focal length obtained when the imaging optical system is set to a most telephoto end.

5. The imaging apparatus according to claim 1, wherein the predetermined object distance is either between 1 m to 100 m.

6. The imaging apparatus according to claim 1, wherein the predetermined amount of overlap is the amount of overlap of 60%.

7. The imaging apparatus according to claim 1, wherein in case where the object distance is 3 m, the amount of overlap becomes 100%.

* * * * *